United States Patent [19]
Anderson

[11] Patent Number: 5,133,786
[45] Date of Patent: Jul. 28, 1992

[54] METHOD AND APPARATUS FOR MINIMIZING ODOR DURING HOT OIL FOOD COOKING

[76] Inventor: Edward M. Anderson, 2620 East Medicine Lake Blvd., Plymouth, Minn. 55441

[21] Appl. No.: 471,221

[22] Filed: Jan. 26, 1990

[51] Int. Cl.$^5$ .............................................. B01D 46/00
[52] U.S. Cl. ................................... 55/97; 55/280; 55/316; 55/338; 55/387; 55/429; 55/467; 55/485; 99/403; 126/299 D; 426/438
[58] Field of Search .............. 55/97, 280, 316, 318, 55/338, 350, 385.1, 387, 429, 467, 471, 485; 99/403; 126/299 D; 426/438

[56] References Cited

U.S. PATENT DOCUMENTS

| | | | |
|---|---|---|---|
| 3,260,189 | 7/1966 | Jensen | 126/299 D |
| 3,286,445 | 11/1966 | Welch | 55/350 |
| 3,391,689 | 7/1968 | Roger | 55/316 |
| 3,800,689 | 4/1974 | Brown | 126/299 D |
| 3,807,148 | 4/1974 | Fike et al. | 55/316 |
| 3,943,836 | 3/1976 | Kuechler | 126/299 D |
| 3,944,405 | 3/1976 | van Calsteren et al. | 55/338 |
| 3,978,777 | 9/1976 | Nett | 126/299 D |
| 4,539,898 | 9/1985 | Bishop et al. | 55/316 |
| 4,854,949 | 8/1989 | Giles, Sr. et al. | 55/316 |

Primary Examiner—Jay H. Woo
Assistant Examiner—C. Scott Bushey
Attorney, Agent, or Firm—Hugh D. Jaeger

[57] ABSTRACT

A method and apparatus for cooking foods such as donuts and pastries in hot oil with new steps and structure being provided to minimize airborne cooking oil and aeromatic odors. The method includes steps of directing an air sheet across the top of the cooking machines, collecting the air sheet and filtering oil several times to remove oil and odors, the collected air flow is split and a minority is recirculated as the air sheet and a majority is exhausted downward upon the floor. The apparatus is self-contained and has the cooking machine atop of a cabinet with the ventilation and filter system being inside the cabinet. There are first, second, third and fourth filters that remove the oil first and the odors lastly. A single air blower collects the air and oil and odors, causes flow through the filters, recirculates a minority portion of the air back to the machine, and exhausts a majority of the air to ambient.

22 Claims, 7 Drawing Sheets

METHOD AND APPARATUS FOR MINIMIZING ODOR DURING HOT OIL FOOD COOKING

BACKGROUND OF THE INVENTION

1. Field of the Invention

This invention relates to ventilation and filtering methods and apparatus for minimizing odor during hot oil food cooking.

2. The Prior Art

Domestic, commercial and institutional systems for ventilation and odor removal during hot oil or fat food cooking are well known and are in common use throughout the world.

However, there is no small discrete or dedicated stand-alone system for kiosks, singular transportable cooking systems and the like, wherein ventilation outlets to ambient are not in place, are not available and are impossible. About the best closed loop fat and odor removal system is the activated charcoal filter and fan used in domestic ranges.

There is an outstanding need for an odor removal system for cooking equipment in shopping center malls and other enclosed buildings.

OBJECTS OF THE INVENTION

It is an object of this invention to provide a new and improved method and apparatus for minimizing odor for hot cooking fat.

It is an object of this invention to provide a new and improved method and apparatus with ventilation and filtration that minimizes odor during hot fat food cooking.

It is an object of this invention to provide a new and improved hot fat food frying apparatus having a new and improved ventilation and odor filtration system.

SUMMARY OF THE INVENTION

A method of minimizing odor from hot cooking fat has the steps of heating cooking oil, blowing a sheet of air across the oil vat, drawing in the air sheet and additional air into an intake duct, filtering the drawn air, dividing the drawn air into two streams, recirculating the first stream over the oil vat, chemically filtering the second air stream, and exhausting the second air stream to ambient.

Apparatus for minimizing odor during hot oil cooking of food has an air outlet duct, an air intake duct, structure for supporting a hot oil food fryer between the ducts, a blower connected to the ducts, structure for dividing blower outlet flow into two streams, structure for directing the first stream to the outlet duct, a filter for the second stream, and structure for exhausting the filtered second stream to ambient.

Apparatus for cooking food in hot oil and minimizing odor has a cabinet, a hot oil cooking machine, an air outlet duct and an air intake duct, a blower within the cabinet and connected to the ducts, an exhaust plenum within the cabinet and connected to the blower outlet, a filter between the blower and the intake duct, a fluid connection between the blower outlet and the outlet duct, a chemical filter structure in the exhaust plenum, and the plenum exhausts to ambient.

DESCRIPTION OF THE PREFERRED EMBODIMENT

Figure 1:
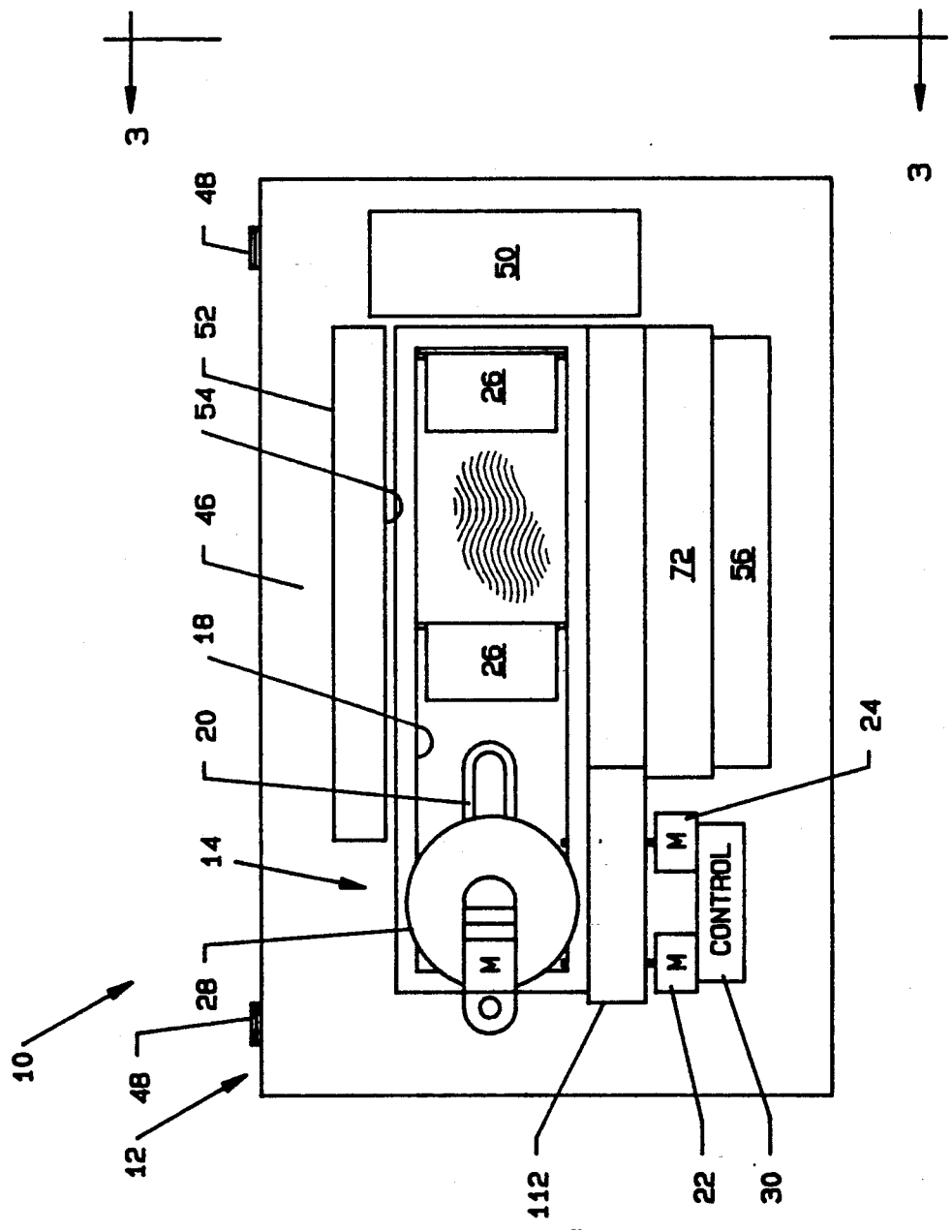
FIG. 1 is a top view of the preferred embodiment of a self-contained apparatus for cooking food in hot oil and for minimizing the odors of cooking.
Figure 2:
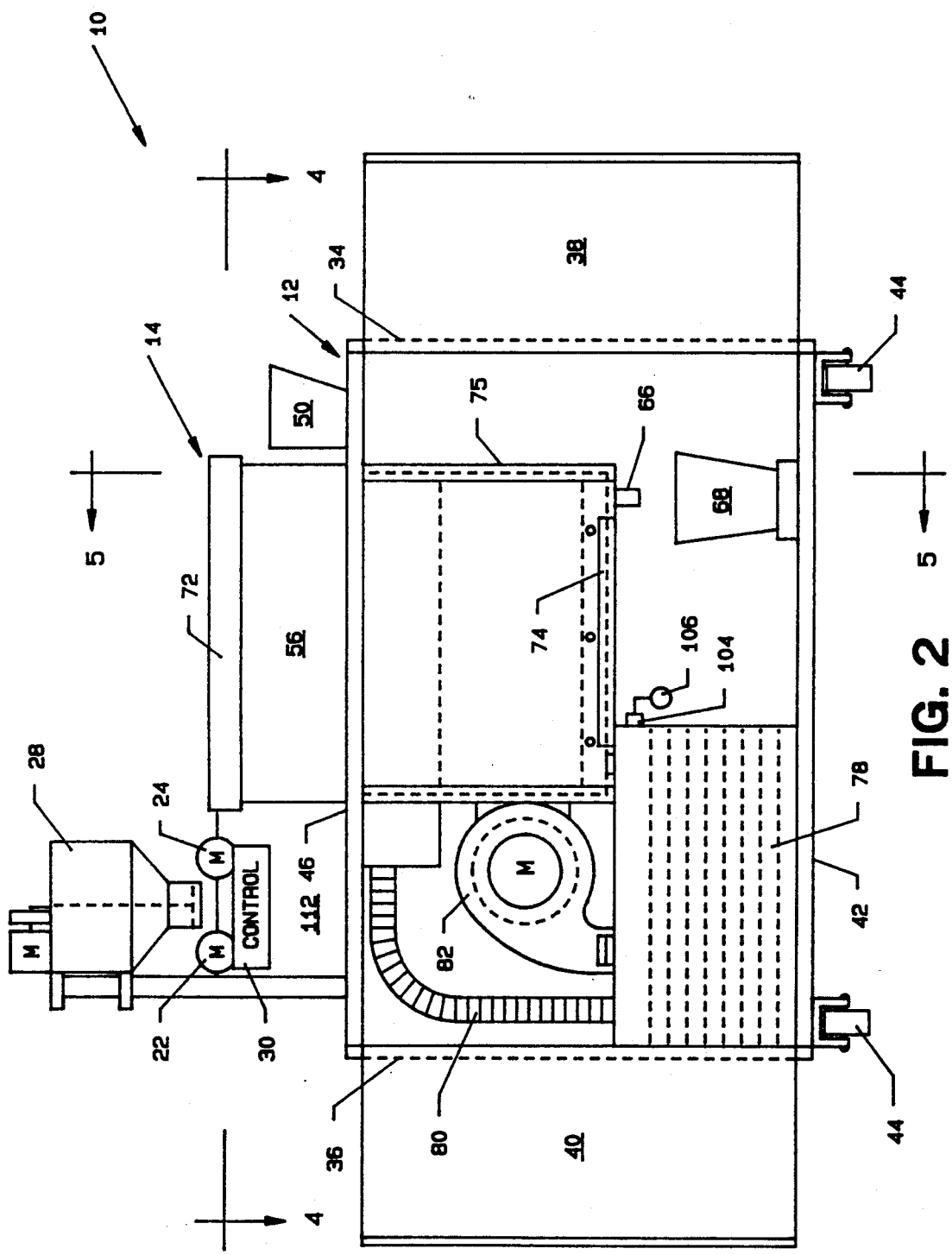
FIG. 2 is a front elevational view of the apparatus of FIG. 1 with the food doors open.
Figure 3:
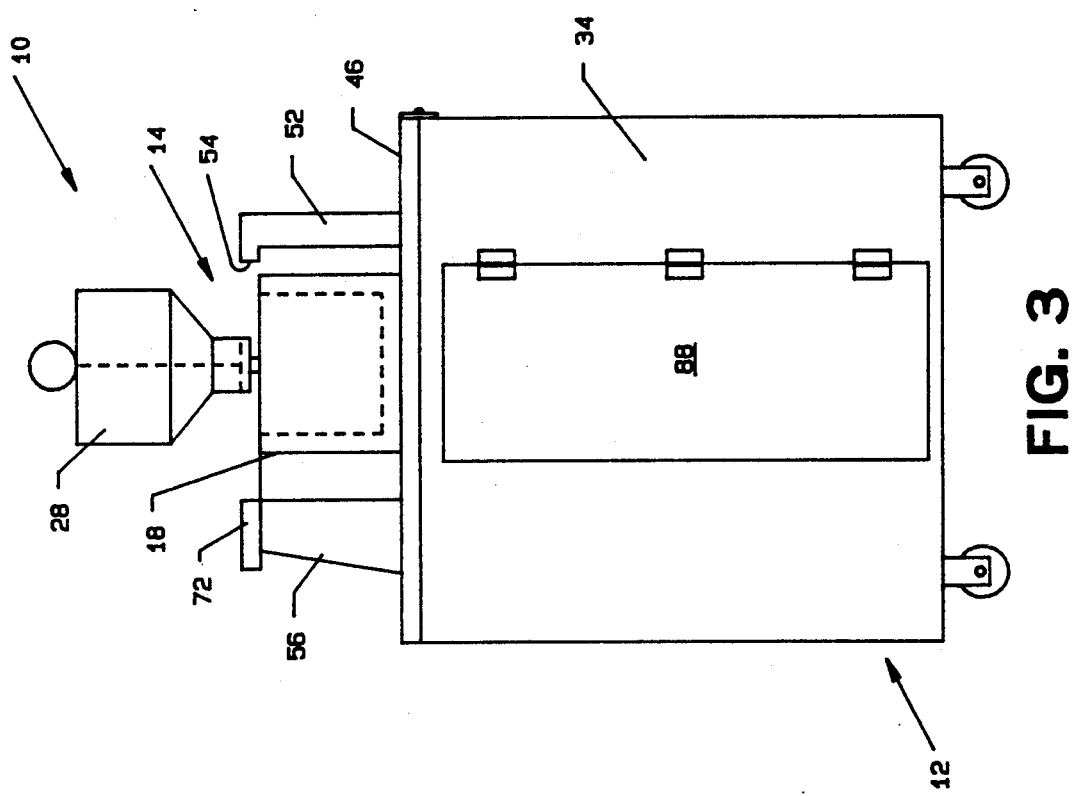
FIG. 3 is an end view of the apparatus of FIG. 1.
Figure 4:
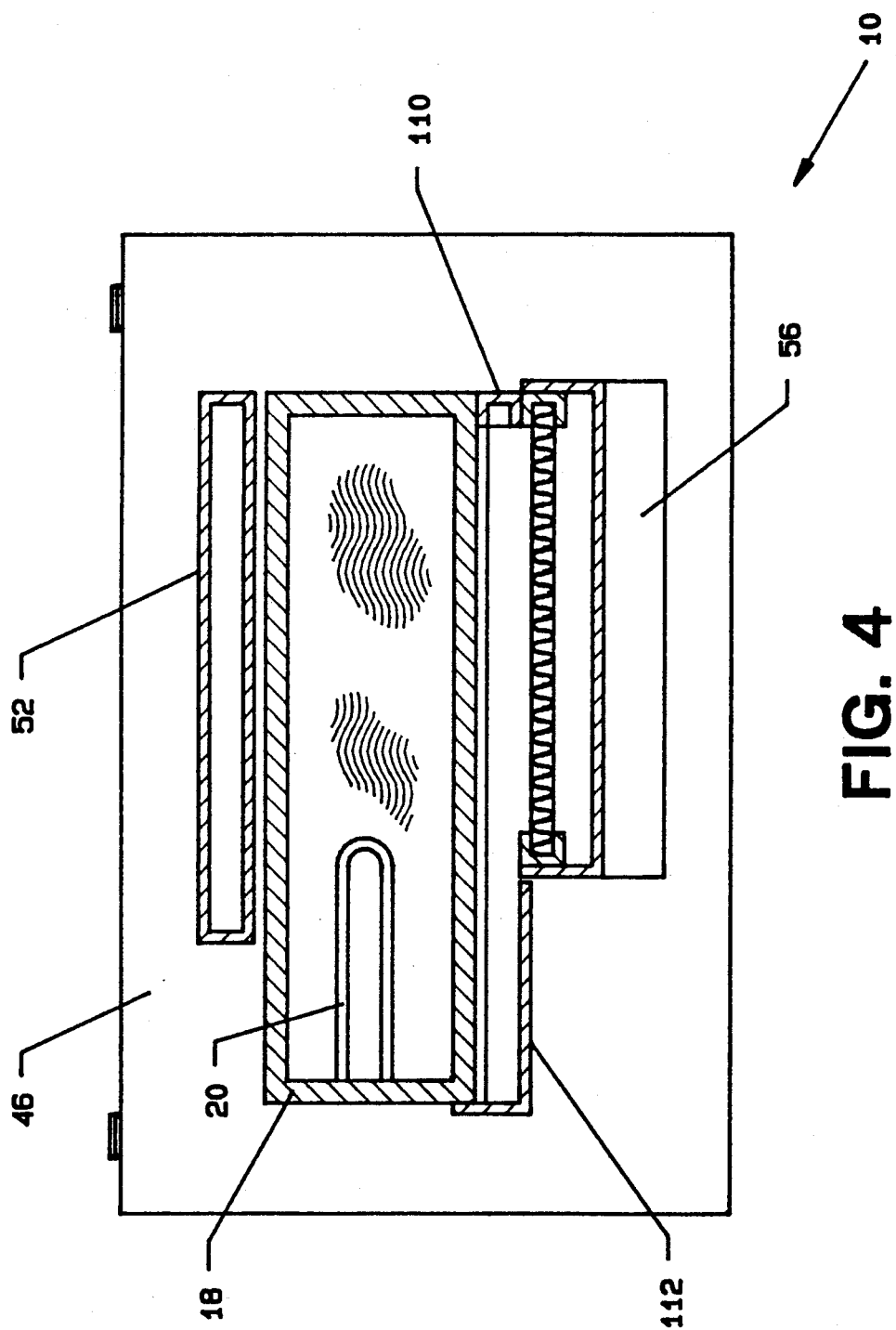
FIG. 4 is a top plan view in cross section through lines IV—IV of FIG. 2.

In accordance with the principles of the present invention, a self-contained apparatus for cooking food in hot oil and minimizing the odors of cooking is shown in FIGS. 1-2 and is generally indicated by the numeral 10. The apparatus 10 is particularly useful for making miniature and full sized donuts, donut holes, other pastries, egg rolls, dough and pasta, cover-filled food snacks, and like foods. The apparatus 10 has a cabinet 12, a hot oil (i.e. deep fat) food cooking machine 14, and a ventilating and filtering apparatus 16, which is hereinafter referred to as the filter system 16.

The cooking machine 14 is a typical hot oil (deep fat) machine having an internal vat 18 with an electric oil heater 20, a first motor 22 to operate a oil circulator (not shown), a second motor 24 to operate food flippers 26, a dough dispenser 28, and a control 30 operatively connected to the heater 20, motors 22, 24 and dispenser 28.

The cabinet 12 has an upright section formed by a back 32, a pair of sides 34, 36 and a pair of front doors 38, 40. The cabinet 12 has a bottom 42 which is spaced up and off of a floor by wheels or legs 44 as is preferred. The cabinet 12 has an openable top 46 which is secured to the back 32 by hinges 48. The cooking machine 14 sits atop of and is supported by the cabinet top 46 as is a basket 50 for cooked food.

The important feature of this invention is the filter system 16, most of which is inside the cabinet 12 and part of which extends through the cabinet top 46.

Figure 5:
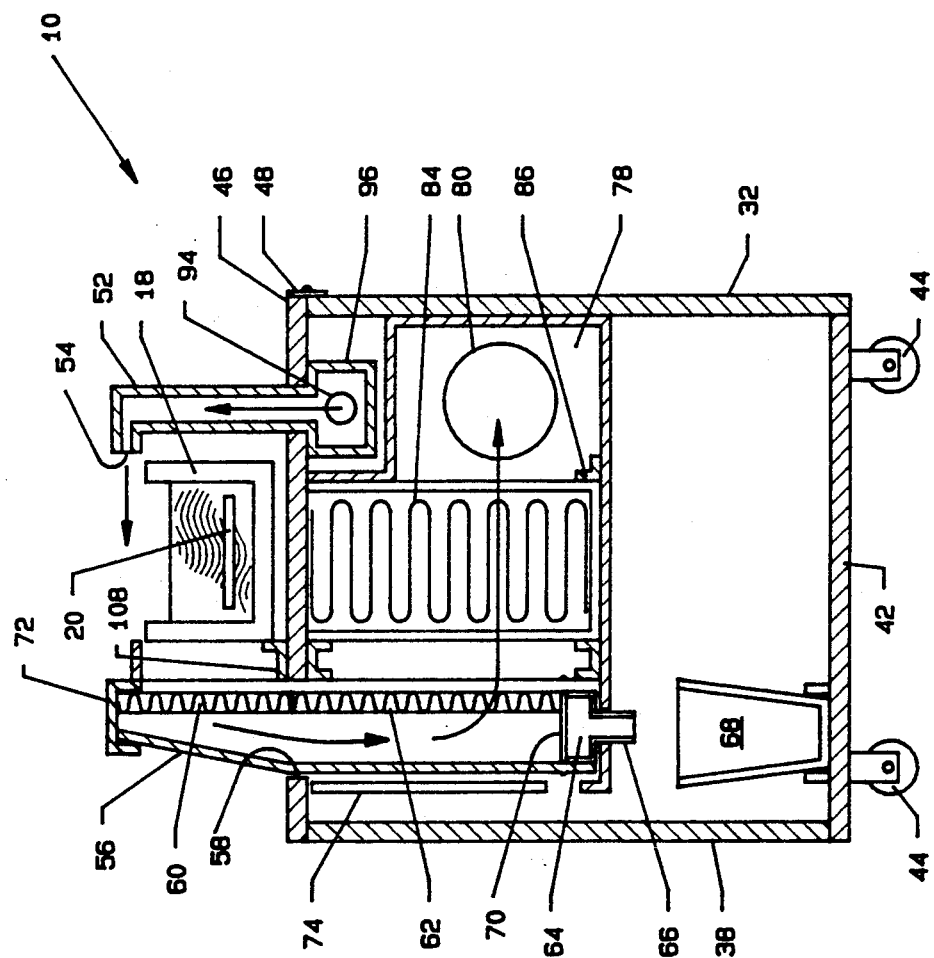
FIG. 5 is an end elevational view in section through lines V—V of FIG. 2.
Figure 6:
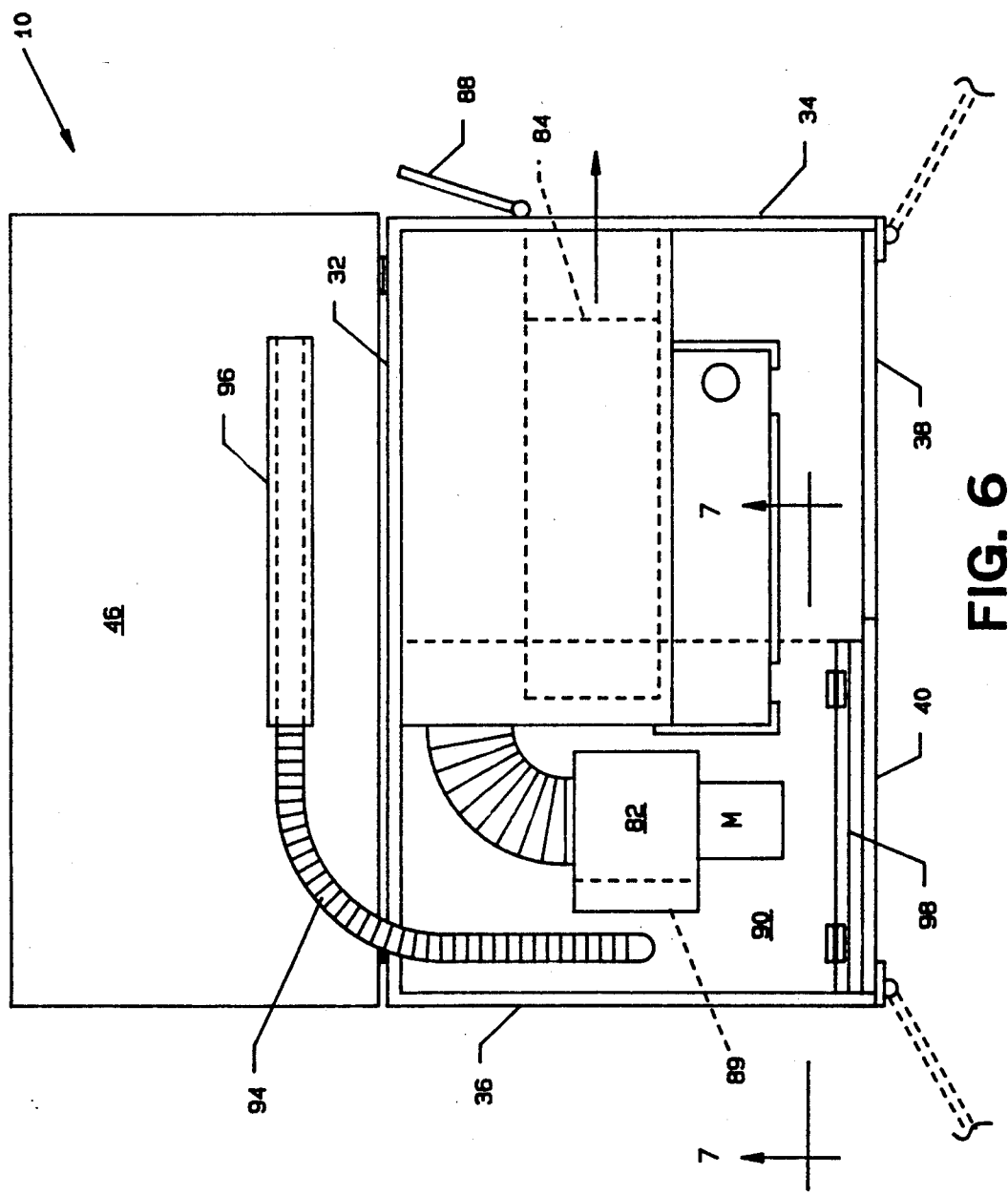
FIG. 6 is a top plan view of the structure of FIG. 1 with the top cover open.
Figure 7:
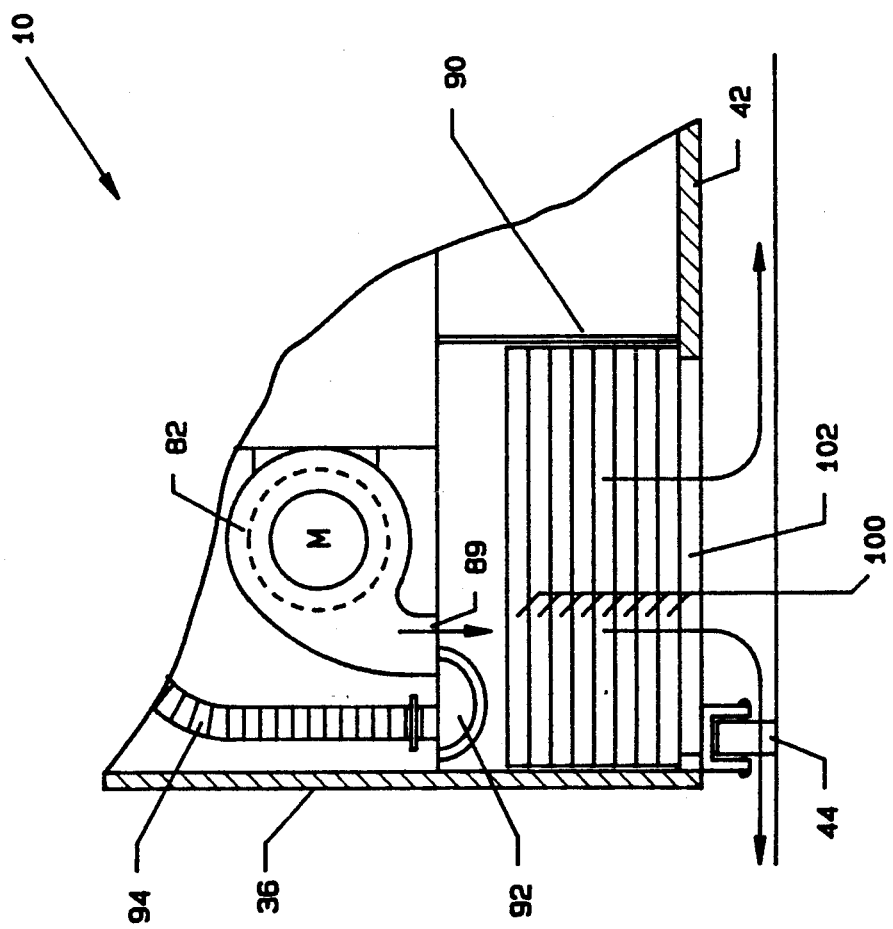
FIG. 7 is an elevational sectional view through lines VII—VII of FIG. 6.

The filter system 16 has an air outlet duct 52 that has an elongated thin flat horizontal nozzle 54 that is best shown in FIG. 5. The nozzle 54 is positioned just atop of the oil vat 18. The nozzle 54 has a length that spans the majority of the length of the cooking machine 14 as clearly shown in FIG. 1 wherein the nozzle 54 extends from just adjacent to the dough dispenser 28 along the length of the machine 14 to the basket 50. The nozzle 54 is right up against and over one side of the vat 18. On the other side of the vat 18 is an air intake duct 56 which is slip fitted through an aperture 58 in the top 46. The intake duct 56 is a discrete structure that is removable from the apparatus 10 by being pulled up and out of the cover aperture 58. The intake duct 56 has a first filter 60 through which the air sheet, the vapors off of the hot oil, and additional air are drawn. The intake duct 56 then has a second filter 62 through which all of the intaken air is drawn. Both filters 60, 62 are mechanical and are of metal screen for physically capturing the airborne hot oil. At the bottom of the intake duct 56 is an oil sump 64 for collecting oil from the filters 60, 62, an oil drain 66 into an oil bucket 68, and cross-pins 70 to hold the filter 62, 60 up and out of the sump 64. Atop of the intake duct 56 is removable cover 72 enabling immediate access to and removability of the first filter 60. The intake duct 56 is slip-fitted into an upright track 72 and is vertically supported and positioned by a track floor 74. Within the cabinet 12 is a suction plenum 78 having an outlet conduit 80 fluidly leading to the inlet of an air blower 82. Between the intake duct 56 and suction plenum is a third filter 84 which is a pleated or plural layer filter having both mechanical filtering, with a fine mesh for remaining airborne oil and chemical filtering with activated charcoal to make a first removal of aromatic and odorous vapors from the hot oil and food.

The third filter 84 is in a longitudinal slide track 86 and is removable and replaceable through a normally closed door 88 in the cabinet end 34. The blower 82 has an outlet 89 into an exhaust plenum 90. An air flow divider 92 is placed in the blower outlet 89 and directs a minority of the air flow into a pressure conduit 94 which fluidly leads to a pressure plenum 96 under the air outlet duct 52. The pressure conduit 94 is a flexible hose which enables easy opening of the cabinet top 46 without disconnection, for enhanced cleaning and service. The exhaust plenum 90 is accessed by opening the front door 40 and a front cover 98 is easily removable off of the exhaust plenum 90. Within the exhaust plenum 90 is a plurality of fourth filter elements 100 and at the bottom is an exhaust outlet 102 which faces and is spaced upward from the floor so that the air flow is exhausted downward directly upon the floor under the cabinet 12. The fourth or exhaust filter elements 100 are all identical and the preferred filter material is an open cell polyester fabric mat, about 0.4 inches (10 mm) thick which is impregnated with activated carbon or charcoal. The preferred activated carbon is based upon coal. This preferred filter is sold under the trademark FIL-PRO and is a chemical filter to remove, in a second step, the remaining aromatic odorous vapors. Each of the filters 100 are discrete and all of the filters 100 are arranged in series in this exhaust air flow. Each of the filters 100 is individually removable and replacable. A pressure transducer 104 and warming light 106 indicate when change of the filters 100 is desirable. It has been found that nine layers of filters 100 is preferred. In changing of the filters 100, the top filter 100 only is changed in the first change, in the second change the first and second filters 100 are changed, in the third change the top three filters 100 are changed and so on until in the ninth change all nine filters 100 are changed and then the cycle starts over.

The cooking machine 14 is tightly fitted between the ducts 82, 56 and is provided with a bottom air dam 108 to prevent short circuiting of air flow under the machine, an end air dam 110 to prevent short circuit of air flow at the finish end of the machine 74, and an air shroud 112 is placed over the beginning end of the machine 14. The shroud 112 closes the end and bottom of the spaces about the motors 22, 24 and control 30 to prevent undesirable air flow. In the air flow through the system 14, several units of free air are intaken, along with the air sheet, to dilute oil and odors and increase the effectiveness of the filters 60, 62, 84, 100.

It has been found that this apparatus 10 completely eliminates noticeable odor during operation of the cooking machine 14. The apparatus 10 can be placed as a stand-alone facility in closed air spaces such as malls, houses, offices, lunch rooms, tourist vehicles and so forth and objectionable odors and airborne cooking oil have been completely eliminated.

Many other advantages, features and additional objects of the present invention will become manifest to those versed in the art upon making reference to the detailed description and accompanying drawings in which the preferred embodiment incorporating the principles of the present invention is set forth and shown by way of illustrative example.

Although other advantages may be found and realized and various modifications may be suggested by those versed in the art, be it understood that I embody within the scope of the patent warranted hereon, all such embodiments as reasonably and properly come within the scope of my contribution to the art.

I claim as my invention:

1. A method of minimizing odor from hot food cooking oil, comprising the steps of:
   a. heating cooking oil in a vat of food frying machine up to an appropriate temperature for cooking food;
   b. blowing a sheet of air across a top of the vat from a first side of the vat to a second side of the vat;
   c. drawing the air sheet into an air intake duct;
   d. filtering the drawn air a first time;
   e. dividing the filtered air into first and second streams;
   f. re-circulating the first stream back across the top of the vat in the air sheet;
   g. filtering the second air stream a second time; and,
   h. exhausting the twice filtered second air stream to ambient.

2. The method of claim 1, including the further step of collecting and draining filtered cooking fat from first filter means for performing said step of filtering the first time.

3. The method of claim 1, in which said step of exhausting is done downward directly upon a floor underneath said frying machine.

4. The method of claim 1, wherein the sheet of air has a width which covers at least a majority of the top of the vat.

5. The method of claim 1, in which said filtering the first time is done upstream of an air blower operatively connected to both said intake duct and a flat air nozzle for directing the air sheet.

6. The method of claim 1, in which said filtering the second time is done with a plurality of layers of chemical filters arranged in fluidic series in the second air stream.

7. Apparatus for minimizing odor during hot oil cooking of food, comprising:
   a. an air outlet duct having a thin flat nozzle for directing a sheet of air in generally laminar flow;
   b. an air intake duct opposed to and spaced from said nozzle;
   c. means for supporting a hot oil food fryer in the spacing between the nozzle and the intake duct;
   d. a blower having an air outlet and an air inlet fluidly connected to said intake duct;
   e. means connected to said air outlet for dividing the air flow into first and second streams;
   f. means extending from said dividing means to said outlet duct for directing the first air stream to the outlet duct;
   g. means fluidly connected to the blower air outlet for chemically filtering the second air stream; and, h. means for exhausting the chemically filtered second air stream to ambient.

8. The apparatus of claim 7, including a hot fat food fryer on said supporting means, said nozzle being above a fat level in said machine.

9. The apparatus of claim 7, including means for collecting and draining cooking fat from said air intake duct.

10. The apparatus of claim 7, in which said air intake duct is a discrete structure removable from said apparatus, said apparatus further including a duct track and support receptive of said duct.

11. The apparatus of claim 10, including at least one removable air filter in said removable air intake duct.

12. The apparatus of claim 7, including an inlet filter element and an outlet filter element in said intake duct.

13. The apparatus of claim 7, including a suction plenum between said intake duct and said blower, and a combination mechanical and chemical filter between said intake duct and said suction plenum.

14. The apparatus of claim 7, in which said exhausting means includes an exhaust plenum fluidly connected to said blower air outlet, said chemical filtering means being in said exhaust plenum.

15. The apparatus of claim 14, in which said chemical filtering means comprise a plurality of discrete elements placed in fluidic series in said second air streams, said elements each being discretely removable from said exhaust plenum.

16. The apparatus of claim 15, in which said blower air outlet is connected to a top of said exhaust plenum, said exhaust plenum having an open bottom facing and spaced upward from a floor below the apparatus.

17. Apparatus for cooking food and minimizing odor during cooking comprising:
   a. a cabinet having a top supported by an upright section;
   b. a hot oil food cooking machine on the cabinet top;
   c. an air outlet duct on a first side of the machine, said duct having a thin flat nozzle for directing a sheet of flowing air across the top of the cooking machine;
   d. an air intake duct on a second side of the machine, both ducts extending downward and into the cabinet;
   e. a blower within said cabinet, said blower having an air inlet fluidly connected to said inlet duct, and an air outlet fluidly connected to said outlet duct;
   f. an exhaust plenum within said cabinet, said plenum having an inlet fluidly connected to said blower outlet and an outlet to ambient;
   g. mechanical filter structure fluidly upstream of said blower for physical removal of cooking fat from air being drawn in by said blower; and,
   h. chemical filter structure in said exhaust plenum between said plenum inlet and plenum outlet, for removal of odor from air before exhaust to ambient.

18. The apparatus of claim 17, in which said chemical filter structure comprises a plurality of individual filter elements that are positioned in series in the exhaust air flow from the blower, each of said individual filter elements being individually replaceable.

19. The apparatus of claim 17, including a filter element in said air intake duct, said element having an upper section for filtering air coming into the intake duct, and a lower section for filtering air leaving the intake duct.

20. The apparatus of claim 19, including means in said intake duct for collecting and disposing of cooking fat.

21. The apparatus of claim 19, including a further filter element between said intake duct and said blower.

22. The apparatus of claim 17, in which said cabinet upright structure is completely enclosing, said cabinet including means for supporting said enclosing upright section off of a floor, and in which said exhaust plenum outlet faces downward toward the floor.

* * * * *